3,322,833
PREPARATION OF AROMATIC ALDEHYDES

Edward J. McNelis, Wallingford, Pa., assignor to Sun Oil Company, Philadelphia, Pa., a corporation of New Jersey
No Drawing. Filed Jan. 24, 1963, Ser. No. 253,764
11 Claims. (Cl. 260—599)

This invention relates to aromatic aldehydes and more particularly to a method for preparing such aldehydes by oxidation of the corresponding aromatic alcohols in accordance with the following reaction:

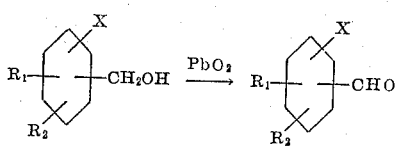

wherein $R_1$ and $R_2$ are selected from the group consisting of hydrogen, an alkyl radical containing from 1 to 18 carbon atoms, and an alkoxy radical containing from 1 to 18 carbon atoms, and X is a nuclear substituent selected from the group consisting of halogen, nitro, and hydrogen.

Aromatic aldehydes are used extensively in the synthesis of other organic compounds. Other specific uses for aromatic aldehydes include those of flavoring agents and synthetic perfumes.

A number of methods have been disclosed in the prior art for the preparation of aromatic aldehydes. They include hydrolysis of dihalides, Gattermann's carbon monoxide synthesis using formyl chloride or the equivalent thereof, and oxidation of various aromatic materials. Aromatic compounds having either alkyl substituents or hydroxy substituents are highly susceptible to oxidation. It has been found that unless extremely carefully controlled conditions be used, the oxidation of such compounds leads to the formation of aromatic acids rather than aromatic aldehydes. In order to prepare aromatic aldehydes by oxidizing an aromatic material such as toluene, it has been found necessary to conduct the oxidation in the presence of a material such as acetic anhydride which would effectively react with the aldehyde group as it is formed and thus prevent the further oxidation thereof to the corresponding aromatic acid. The effect of such blocking reaction necessitates subsequent processing steps such as hydrolysis to recover the desired aldehyde product.

A method has now been found whereby aromatic aldehydes can be prepared directly from the corresponding aromatic alcohols without the need for any blocking reaction to take place.

Briefly the instant invention comprises contacting an aromatic alcohol, such as benzyl alcohol, with lead dioxide at a temperature in the range of 0° C. to 250° C. in an inert atmosphere for a period of time ranging between 10 seconds and 50 hours and recovering an aromatic aldehyde product. Suitable aromatic alcohols which can be used to prepare aromatic aldehydes in accordance with the instant invention have the general formula

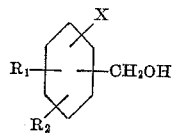

wherein $R_1$ and $R_2$ are selected from the group consisting of hydrogen, alkyl radicals containing from 1 to 18 carbon atoms and alkoxy radicals containing from 1 to 18 carbon atoms, and X is a nuclear substituent selected from the group consisting of halogen, nitro and hydrogen. Examples of specific compounds include:

benzyl alcohol
o-methyl benzyl alcohol
m-methyl benzyl alcohol
p-methyl benzyl alcohol
m-isopropyl benzyl alcohol
p-isopropyl benzyl alcohol
p-t-butyl benzyl alcohol
p-n-amyl benzyl alcohol
m-neohexyl benzyl alcohol
m-n-heptyl benzyl alcohol
p-diisobutyl benzyl alcohol
m-(2-methyl octyl) benzyl alcohol
p-n-undecyl benzyl alcohol
p-(2-methyl-5-ethyl-7,7-dimethyl nonyl) benzyl alcohol
p-(2,4,6,8-tetramethyl undecyl) benzyl alcohol
2,6-dimethyl benzyl alcohol
3,5-diethyl benzyl alcohol
3-ethyl-5-t-butyl benzyl alcohol
2-methyl-4-neopentyl benzyl alcohol
3,5-di-n-dodecyl benzyl alcohol
2,6-dimethoxy benzyl alcohol
3,5-diethoxy benzyl alcohol
2-methoxy-4-butoxy benzyl alcohol
p-nitro benzyl alcohol
m-chloro benzyl alcohol
p-bromo benzyl alcohol
2-methyl-4-nitro benzyl alcohol
3-methoxyl-5-chloro benzyl alcohol
2,6-dimethyl-4-nitro benzyl alcohol
2,6-diethyl-4-bromo benzyl alcohol The aromatic alcohol can be contacted with the lead dioxide either in the presence or absence of a solvent material and in an inert atmosphere. It is preferred that prior to contacting the aromatic alcohol with lead dioxide, it be dissolved in a suitable solvent. It is important that the solvent be inert and not be susceptible to oxidation. Examples of suitable solvents include chloroform, benzene, nitrobenzene, chlorobenzene, diethyl ether, and petroleum ether. Petroleum ether and diethyl ether are the preferred solvents.

As stated above the oxidation reaction is carried out in an inert atmosphere. Examples thereof include nitrogen, methane, and carbon dioxide. Nitrogen is the preferred material.

The temperature at which the aromatic alcohol or solution of aromatic alcohol is contacted with the lead dioxide can vary over a wide range. It has been found that substantial amounts of aromatic aldehyde products are produced at a temperature of 20° C. or lower. If the aromatic alcohol is not contained in a solvent, the maximum temperature to which the reaction mass can be heated is goverened only by the decomposition temperature of the aromatic alcohol. If the alcohol is dissolved in a solvent prior to the contacting thereof with the lead dioxide, the maximum temperature to which the reaction mass can be heated is governed by the boiling point of the solvent at the pressure used. While temperatures ranging between 0°C. to as high as 250° C. can be used in this invention, it is preferred that a temperature ranging between about 20° C. and 100° C. be used.

The time that the reaction mixture is contacted can vary between 10 seconds and 50 hours or longer. It is preferred that the contacting time range between 0.5 hour and 24 hours.

The molar ratio of lead dioxide to the aromatic alcohol can also vary over wide limits. It has been found that if trace amounts of lead dioxide are present in the reaction mass, there is produced some aldehyde product. It is preferred, however, that the molar ratio of lead dioxide to alcohol be in the range of from about 1:100 to 100:1 with a molar ratio ranging between about 3:1 and 10:1 being most preferred.

Since the instant process involves a heterogenous reaction system, the recovery of the desired aldehyde product is effected by first separating the solid lead dioxide from the liquid phase by conventional methods such as filtration. The filtrate containing aldehyde and unreacted alcohol is subjected to fractional distillation. The aldehyde is recovered therefrom and the unreacted alcohol and solvent can also be recovered and recycled.

The following example further illustrates the instant invention.

*Example*

A solution of 0.4062 g. benzyl alcohol dissolved in 50 ml. of ethyl ether was contacted with 23.9 g. of lead dioxide for 18 hours at room temperature (20° C.) in a nitrogen atmosphere. At the end of the reaction time the mixture was separated by filtration. Upon infrared analysis and vapor phase chromotography, the ether filtrate was shown to contain 50% by weight benzaldehyde and 50% by weight unreacted benzyl alcohol. The yield of benzaldehyde was 55%.

Substantially similar results are obtained when other of the solvents named above are substituted for ethyl ether and when other aromatic alcohols such as p-methyl benzyl alcohol, p-t-butyl benzyl alcohol, 2-6-dimethyl benzyl alcohol, 2,6-dimethoxy benzyl alcohol, p-nitro benzyl alcohol, and p-bromobenzyl alcohol are substituted in the foregoing example.

I claim:

1. Method for preparing aromatic aldehydes having the general formula

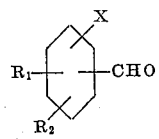

wherein $R_1$ and $R_2$ are selected from the group consisting of hydrogen, alkyl radicals containing from 1 to 18 carbon atoms and alkoxy radicals containing from 1 to 18 carbon atoms, and X is a nuclear substitutent selected from the group consisting of halogen, nitro and hydrogen, which comprises contacting the corresponding aromatic alcohol in an inert solvent with lead dioxide in an inert atmosphere and thereafter recovering said aromatic aldehyde product.

2. Method in accordance with claim 1 wherein the aromatic alcohol is contacted with the lead dioxide at a temperature in the range of from 0° C. to 250° C. for a period of time ranging between 10 seconds and 50 hours.

3. Method for preparing aromatic aldehydes which comprises dissolving in an inert solvent an aromatic alcohol having the general formula

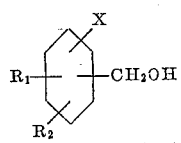

wherein $R_1$ and $R_2$ are selected from the group consisting of hydrogen, alkyl radicals containing from 1 to 18 carbon atoms and alkoxy radicals containing from 1 to 18 carbon atoms, and X is a nuclear substituent selected from the group consisting of halogen, nitro and hydrogen, contacting the resulting solution with lead dioxide at a temperature in the range of from 0° C. to 250° C. for a period of time ranging between 10 seconds and 50 hours in an inert atmosphere and thereafter recovering said aromatic aldehyde product.

4. Method in accordance with claim 3 wherein said solvent is selected from the group consisting of chloroform, benzene, nitrobenzene, chlorobenzene, ethyl ether, and petroleum ether.

5. Method in accordance with claim 4 wherein the temperature is in the range of from 20° C. to 100 ° C. and the period of time is from 0.5 hour to 24 hours.

6. Method in accordance with claim 3 wherein the temperature is in the range of from 20° C. to 100° C. and the period of time is from 0.5 hour to 24 hours.

7. Method for preparing aromatic aldehydes which comprises dissolving in an inert solvent an aromatic alcohol having the general formula

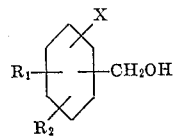

wherein $R_1$ and $R_2$ are selected from the group consisting of hydrogen, alkyl radicals containing from 1 to 18 carbon atoms and alkoxy radicals containing from 1 to 18 carbon atoms, and X is a nuclear substituent selected from the group consisting of halogen, nitro and hydrogen, contacting the resulting solution with from 0.01 to 100.0 moles of lead dioxide per mole of alcohol starting material at a temperature in the range of from 0° C. to 250° C. for a period of time ranging between 10 seconds and 50 hours in an inert atmosphere and thereafter recovering said aromatic aldehyde product.

8. Method in accordance with claim 7 wherein the molar ratio of lead dioxide to alcohol starting material is in the range of 3:1 to 10:1.

9. Method in accordance with claim 7 wherein the solvent is ethyl ether and the temperature is in the range of from 20° C. to 100° C.

10. Method for preparing benzaldehyde which comprises dissolving benzyl alcohol in diethyl ether and contacting the resulting solution with from 0.01 to 100.0 moles of lead dioxide per mole of benzyl alcohol at a temperature in the range of from 20° C. to 100° C. in an inert atmosphere for a period of time ranging between 0.5 hour to 24 hours and thereafter recovering benzaldehyde.

11. Method in accordance with claim 10 wherein the molar ratio of lead dioxide to benzyl alcohol is in the range of 3:1 to 10:1.

References Cited

Cohn: Laboratory Manual of Organic Chemistry, p. 261, 1896.

Houben-Weyl: Methoden Der Organischen Chemie, vol. 7/1, 1954, p. 179.

Jacobson: Encyclopedia of Chemical Reactions, vol. II, p. 447, (1948).

LEON ZITVER, *Primary Examiner.*

J. J. SETELIK, ROSCOE H. LILES, *Assistant Examiners.*